Figure 1:
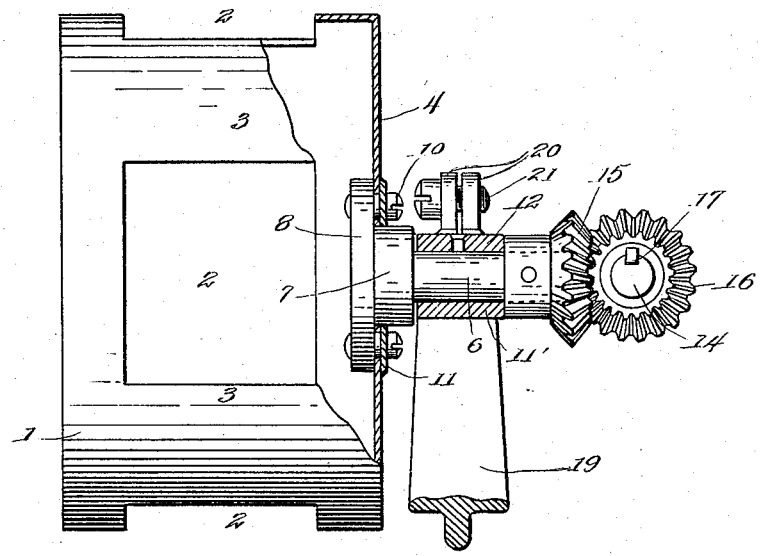

B. H. CALDWELL.
SHUTTER APPARATUS FOR MOTION PICTURE PROJECTING MACHINES.
APPLICATION FILED DEC. 7, 1912.

1,160,495.

Patented Nov. 16, 1915.

2 SHEETS—SHEET 1.

WITNESSES

INVENTOR
Burr H. Caldwell,
Richard Eyer
His Attorney

B. H. CALDWELL.
SHUTTER APPARATUS FOR MOTION PICTURE PROJECTING MACHINES.
APPLICATION FILED DEC. 7, 1912.
1,160,495.
Patented Nov. 16, 1915.
2 SHEETS—SHEET 2.
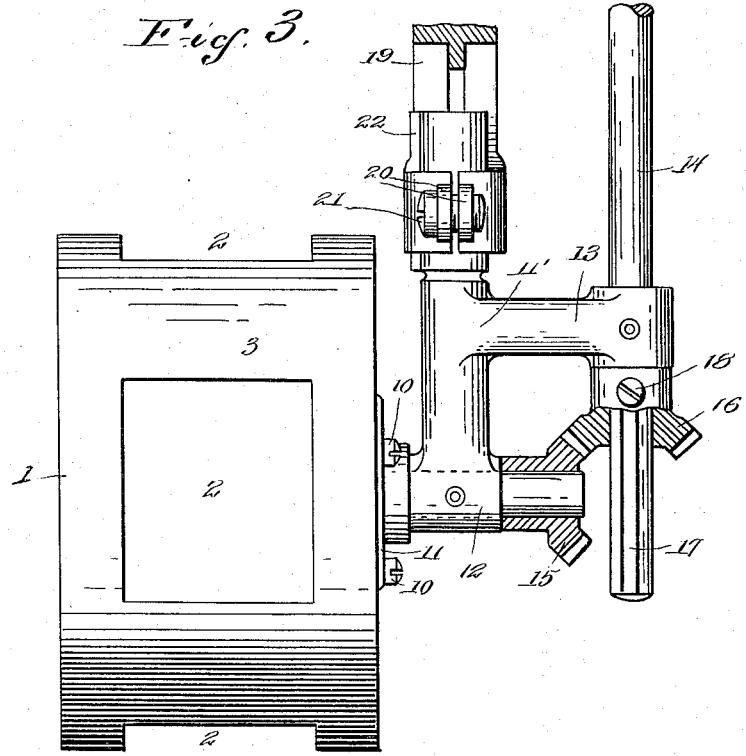
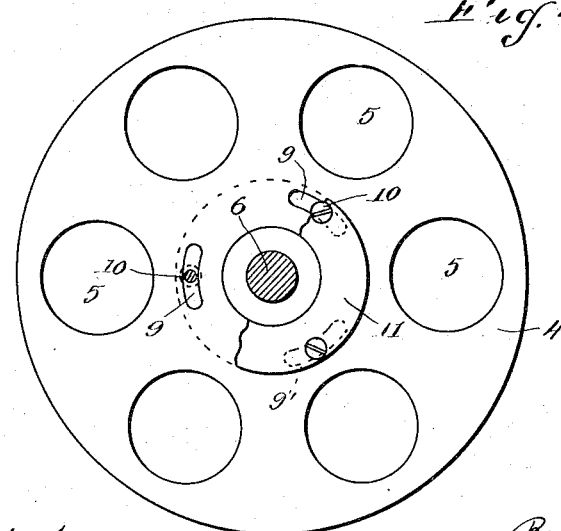

UNITED STATES PATENT OFFICE.

BURR H. CALDWELL, OF NIAGARA FALLS, NEW YORK.

SHUTTER APPARATUS FOR MOTION-PICTURE-PROJECTING MACHINES.

1,160,495. Specification of Letters Patent. Patented Nov. 16, 1915.

Application filed December 7, 1912. Serial No. 735,490.

*To all whom it may concern:*

Be it known that I, BURR H. CALDWELL, a citizen of the United States, residing at Niagara Falls, in the county of Niagara and State of New York, have invented new and useful Improvements in Shutter Apparatus for Motion-Picture-Projecting Machines, of which the following is a specification.
My invention relates to shutter apparatus for motion picture projecting machines.

In connection with the type of shutters now in use, considerable flicker occurs, as the segmental wings of the closing fan-like shutter, in closing the windows must travel the necessary distance to first cover one corner of the window of the apparatus and then the diagonally opposite corner, as the defining side lines of the segments are diametric, and only parallel with the upper and lower edges of the window when exactly intermediate the same. Through the employment of a device constructed in accordance with my invention, the amount of flicker is considerably reduced, as the shutter closes the opening across the true or narrowest width, the edges of the shutter at the openings at all times being parallel to the edges of the window of the picture projecting apparatus, and as the device is capable of more rapid operation than existing shutters to decrease the time of non-exposure, since the flicker is caused by the absence of illumination due to the shutter interrupting the light rays between each successive picture, and the flicker is therefor in direct proportion to the length of the period of non-exposure as compared to the period of exposure.
Another object of my invention is to provide an effective shutter device for a motion picture projecting machine that may be made essentially of a single member movable in front of the lens of the machine.
Still another object of the invention is to provide a shutter device that is operable or rotatable in a vertical plane.

Still another object of the invention is to provide effective means whereby such a shutter device as that set forth may be adjusted to proper position relative to the lens of the machine.

Other objects of the invention are to generally improve and simplify the construction of a device of this kind and to provide one that may be manufactured at minimum cost.

The embodiment of the preferred form of the invention is shown in the drawings accompanying this application, and therein:—

Figure 2:
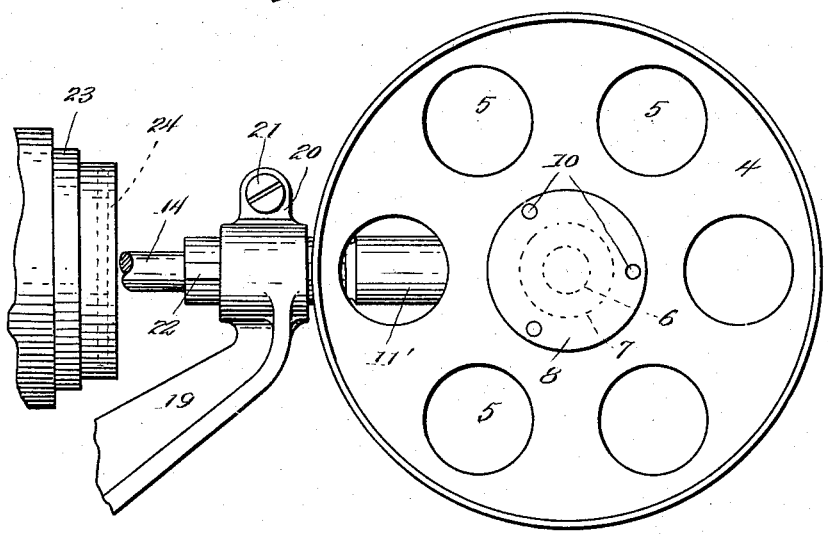

Figure 1 is a view mostly in end elevation but partly broken away and in section. Fig. 2 is a side view of the same parts with the addition of the lens tube of the machine. Fig. 3 is a plan view of the parts of Fig. 1, and Fig. 4 is a side view of the shutter proper showing the shaft therefor and exterior plate partly broken away.

In the drawings like reference characters designate like or similar parts throughout the several views.

The shutter proper employed consists essentially of an annular rim 1 which is provided with a plurality of diametrically alining openings 2 therein. By thus providing the openings, it will be realized that the parts of the rim intermediate the openings designated 3, as well as the openings, will be even in number. The rim at one side thereof is provided with a wall 4 preferably having a plurality of openings 5 provided therein. It will thus be seen that the shutter proper is a hollow structure and substantially closed at one end only. This shutter proper is mounted to rotate with a shaft 6 having a hub 7 which extends through a central opening in wall 4 and a plate 8 of greater diameter than the hub and located interior of the shutter. In the wall 4 is provided one or more arcuate elongated slots 9 through which pass set screws 10 adapted to fasten or secure the shutter to the shaft. Between the wall 4 and heads of the set screws, a plate 11 is preferably provided and the openings therein, through which the screws pass, are merely of such size as to accommodate the passage of the screws therethrough.

Shaft 6 is rotatably mounted in a slidable or bodily movable bearing member designated 11', the said shaft being directly journaled in an arm 12 thereof. Projecting at right angles to the arm 12 is a similar arm 13. In said arm 13 is rotatably mounted a shaft 14. On shaft 6 is mounted in any suitable manner a bevel gear wheel 15 which meshes with a bevel gear wheel 16. Said bevel gear wheel 16 is mounted to slide upon the shaft 14 but at the same time is adjustably secured thereto. The means for adjustably securing the bevel gear wheel 16 to shaft 14 consists preferably of a key 17 fastened to the shaft 14 and engaged by a slot in the gear wheel 16. To rigidly fasten the gear wheel 16 at the desired adjustment along the shaft 14, a set screw 18 is provided which may be clamped or screwed friction tight against the key 17. The bearing member 11' is suitably supported, as by means of a bracket arm 19 of a motion picture projecting machine. Such bearing is removably and adjustably secured to the arm 19 by means of a split collar, the ends of which collar terminate in lugs 20 with which engage a clamping set-screw 21. On the bearing member 11' at the part thereof clamped by the collar, is preferably formed a key or spline 22 adapted to engage a correspondingly shaped opening in the collar. Shaft 14 may be supported and driven in any suitable manner.

In operation, through the driving shaft 14 and the intermeshing of gears 15 and 16 and the former's connection to the shutter, said shutter is rotated and in a vertical plane relatively to the machine. The lens tube of the machine is shown in Fig. 2 and designated 23, the lens therein being designated 24. By reason of the provision of the elongated slots 9 and set-screws 10, the shutter may be adjusted so as to properly position the openings 2 relatively to the film or pictures thereon, before the shutter is rotated or positively driven. To secure the proper lateral adjustment of the shutter relatively to the lens of the machine, the shutter is moved longitudinally and fastened in the desired position through the adjustment of lugs 20 and set-screw 21 and through sliding adjustment of the bevel gear 16 and set-screw 18.

It will thus be seen that I have provided a shutter member proper made of a single piece as distinguished from a shutter device having a plurality of relatively movable parts. Also it will be seen that effective means have been provided for the necessary adjustment of the shutter to render the same desirable and highly efficient in operation; at the same time providing a device of few and simple parts which may be manufactured at a minimum cost.

As merely the preferred embodiment of the invention has been illustrated and described, and as changes in the details of construction thereof may suggest themselves, such changes are reserved, provided they fall within the spirit and scope of the appended claims.

Having thus described my said invention, what I claim as new and desire to secure by Letters Patent, is:—

1. In a device of the class described, a driving shaft, a gear wheel slidable on said shaft, means for fastening said gear wheel and shaft for rotary movement in unison, a bearing adjustable longitudinally with respect to said shaft, a second shaft, said second shaft mounted in said bearing, a gear wheel on said second shaft in mesh with said gear wheel and a shutter device mounted for rotation with said second shaft.

2. In a device of the class described, a bearing, supporting means for said bearing, said bearing adjustable longitudinally of the supporting means, a shaft mounted in said bearing, a shutter device mounted on said shaft, a gear wheel on said shaft, a second shaft, a second gear wheel, said second gear wheel mounted on said second shaft and in mesh with said first gear wheel, said second gear wheel slidable longitudinally of the second shaft, means fastening said second gear wheel and second shaft for rotary movement in unison.

3. In a device of the class described, a shutter member, a shaft therefor, a bearing member for said shaft, a second shaft supported by said bearing member, said bearing member slidable on said second shaft, a gear wheel slidable on said second shaft, and a gear wheel on said first shaft to mesh therewith.

4. In a device of the class described, in combination with a support, a bearing member adjustable relatively to the support, a first shaft journaled in said bearing member, a shutter operated thereby, a second shaft journaled in said bearing member, said bearing member slidable on said second shaft, a gear wheel slidable on said second shaft, and a gear wheel on said first shaft to mesh with the gear wheel of the second shaft.

5. In a device of the class described, in combination with a support, a bearing member slidable in and adjustably secured to said support, said bearing member having angle arms, a first shaft mounted in one of said arms, a shutter device provided with an elongated slot, a plate on said shaft interior of the shutter, means passing through said slot and engaging said plate to fasten said shutter adjustably thereto, a shaft mounted in the other angle arm, said bearing slidable on said shaft, a projecting member on said latter shaft, a bevel gear slidable on said latter shaft having a slot to engage said projecting member, a set-screw on said bevel gear to clamp the same to its shaft, and a bevel gear on said first shaft to mesh with said bevel gear.

BURR H. CALDWELL.

Witnesses:
 GALEN P. BROOKS,
 GORDON HAYES.